United States Patent [19]

Santucci et al.

[11] Patent Number: 4,635,886

[45] Date of Patent: Jan. 13, 1987

[54] FLAT WIRE CLIP

[75] Inventors: Donald Santucci, Wheaton; Phillip W. Denemark, Bloomingdale, both of Ill.

[73] Assignee: DEK, Inc., St. Charles, Ill.

[21] Appl. No.: 789,079

[22] Filed: Oct. 18, 1985

[51] Int. Cl.⁴ .................................................. F16L 3/08
[52] U.S. Cl. ........................................ 248/73; 24/543; 248/74.1
[58] Field of Search ................... 248/74.1, 74.2, 74.3, 248/68, 73; 24/541, 305, 339, 336, 297, 543, 16 PB, 17 AP

[56] References Cited

U.S. PATENT DOCUMENTS

| | | | |
|---|---|---|---|
| 3,163,712 | 12/1964 | Cochran | 248/74.3 X |
| 3,991,960 | 11/1976 | Tanaka | 248/74.3 X |
| 4,094,483 | 6/1978 | Busch | 248/221.4 X |
| 4,221,352 | 9/1980 | Caveney | 248/74.3 |
| 4,325,526 | 4/1982 | Kitagawa | 248/73 |
| 4,457,482 | 7/1984 | Kitagawa | 248/73 X |

FOREIGN PATENT DOCUMENTS

| | | | |
|---|---|---|---|
| 1000677 | 11/1976 | Canada | 248/73 |
| 2442414 | 3/1976 | Fed. Rep. of Germany | 248/74.3 |
| 2066887 | 7/1981 | United Kingdom | 248/73 |

*Primary Examiner*—J. Franklin Foss
*Assistant Examiner*—David L. Talbott
*Attorney, Agent, or Firm*—McDougall, Hersh & Scott

[57] ABSTRACT

An integral plastic clip for retaining flat wire or ribbon cables defining a generally rectangular enclosure. The enclosure includes a planar base member adapted to be mounted to a surface and a strap member extending from the base member and forming the top and two side walls of the rectangular enclosure. The strap is integrally formed onto the base at one end and includes a releasable latch arrangement at its other end to engage the base at that second end thereby completing the rectangular enclosure. Primary and secondary curved and tapered cantilever arms extend inwardly from the top wall. The cantilever arms are provided with contoured tips to facilitate sliding movement of arms during latching engagement of the flat wire bundles.

4 Claims, 5 Drawing Figures

FLAT WIRE CLIP

The present invention pertains to plastic wire retention clips and, in particular, to an improved clip for retaining flat wire or ribbon cables, for example, multi-conductor cables utilized to interface computer hardward or the like.

Known flat wire clips are commonly of rectangular form defined by a base and an integral strap extending therefrom. The strap is molded to form generally rigid top and two side walls. A releasable latch is provided between the free end of the strap and the base to facilitate complete closure of the rectangular area thereby capturing the ribbon cables therein.

It is considered desirable, however, that the cables be firmly grasped by the clip and therefore known clips have incorporated an integral banjo spring arrangement extending downwardly from the top wall to urge the flat wire cables firmly against the lower base member. Clips of this type suffer certain known deficiencies. First, the banjo spring occupies a significant proportion of the rectangular space defined within the clip thereby limiting the number and size of cables which can be placed therein. Such clips can be made to accommodate an increased number of cables, but only at the expense of a corresponding increased overall clip size.

A second limitation of the banjo spring arrangement is its relatively limited range of compression. Consequently, whatever the overall size of the clip, if it is dimensioned to grasp a single ribbon bundle, it cannot accept multiple cable runs of substantially increased thickness without significant clip deformation and distortion.

The improved clip of the present invention utilizes a pair of arcuate cantilever arms affixed to the top wall immediately adjacent, respectively, the side walls and extending downwardly and inwardly in opposed relationship into the rectangular cable retention space. More specifically, one of the arms, known as the primary arm, extends substantially into abutting contact with the opposed base wall (with the clip latched) thereby facilitating engagement with single or narrow flat cable runs. The secondary arm extends only partially across the rectangular cable retention space, terminating adjacent a point generally midway along the primary arm. The end regions of the arms are contoured to facilitate non-binding movement of the arms with respect of both the cables therein and to one another as the strap portion of the clip is closed and latched. As cables of increasing overall thickness are received within the clip, the arms coact to generate the required cable retention forces while simultaneously nesting adjacent, and in parallel relationship to, the top wall. In this manner the clip can accommodate overall cable thicknesses virtually from zero to just short of the height of the rectangular clip space. Further, the present structure avoids the significant top wall deformation common to clips utilizing the banjo spring by reason of the placement of cantilever arms immediately adjacent the side walls which, in turn, precludes top wall movement.

It is therefore an object of the present invention to provide an improved plastic flat wire or ribbon cable clip obviating the above limitations of known clip structures. In particular, it is an object that the present clip shall latch thereby firmly grasping the flat wire or ribbon cables therein. The clip shall include an integral biasing arrangement to effect the above described grasping. A further object is a biasing arrangement adapted to accommodate a range of flat wires from the single or narrow cable through multiple or thick cables in excess, at least, of fifty percent of the available clip height. Another object of the invention is a cable bias arrangement that nests whereby a minimum of unusable dead space results. Yet another object is a clip that does not distort when loaded with a maximum quantity of cables.

DESCRIPTION OF THE PREFERRED EMBODIMENT

Figure 1:
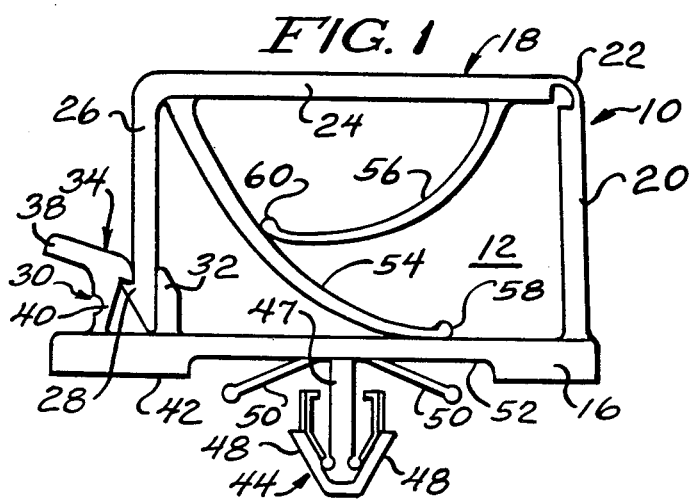
FIG. 1 is a front elevation view of the flat wire clip of the present invention shown latched but without flat wire or ribbon cables therein.
Figure 2:
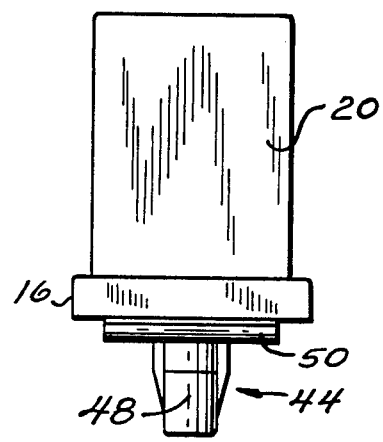
FIG. 2 is a side elevation view of the flat wire clip of FIG. 1.

Referring to the figures, the flat wire clip 10 of the present invention circumscribes a generally rectangular passage or opening 12 adapted for passage and retention of flat wire and ribbon cables 14. The clip is injection molded as an integral unit, preferably of a plastic material, for example, 6/6 nylon.

The clip includes a planar base 16 and a three-sided strap member 18 affixed to one end thereof. More specifically, the strap member includes a first side wall 20 extending perpendicularly upwardly from the base which, at its upper end, is connected through a flexible hinge 22, to top wall 24 then, in turn, to second side wall 26. The walls 24 and 26 are rigidly formed at substantially a right angle although a hinge could be provided at this interface and, as well, at the juncture of the base and side wall 20.

A ridge or tooth 28 is formed along the lower outside edge of side wall 26 which is adapted, as illustrated in FIG. 1, to be received within the releasable latch 30. Latch 30 includes a rigid abutment wall 32 and a flexible wall 34 both extending upwardly from the base 16 and oriented in generally parallel relationship to tooth 28 on the tip of the strap member. These walls coact, as set forth below, to secure the end of strap 18 to base 16.

Wall 34 includes a tooth 36 along its upper end and in opposed relationship to the adjacent rigid wall 32. Wall 34 further includes a finger release lever 38 and a hinge region 40 positioned at the lower portion of the wall. The spacing between tooth 36 and wall 32 is selected to be less than the thickness of the strap thereby assuring biasing and engagement of the flexible wall tooth 36 with the strap tooth 28. It will be appreciated that respective teeth 28 and 40 provide a locking interference fit thereby precluding the upward movement of the strap once the strap has been inserted into latch 30. However, the application of a downward force on lever 38 pivotally rotates flexible wall 34 in an outward direction (as illustrated by the phantom outline 35 of wall 34, FIG. 3) thereby disengaging teeth 28 and 36 and, in turn, releasing the strap and opening the clip. In this manner, cables may be added or removed from the bundle within the clip.

Figure 3:
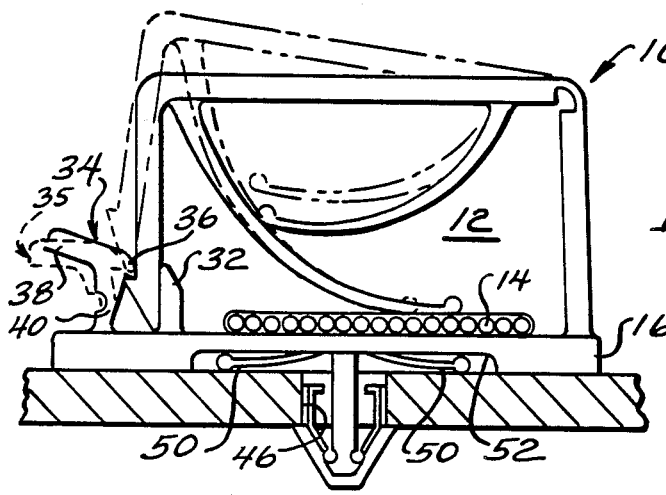
FIG. 3 is a front elevation view of the flat wire clip of the present invention illustrating closure on a single, narrow ribbon cable.

Clip 10 may be affixed to the working surface by use of an adhesive along the bottom 42 of base 16 or, as illustrated, the clip may be retained using the mounting post 44 of FIG. 1 which is adapted to seat in a complementary surface hole 46 (FIG. 3). Mounting post 44 includes a center column 47 having a pair of opposed barbs 48 tapered backwardly at an angle from the tip thereof. The cantilever mounted barbs flex radially inwardly (toward column 47) upon insertion of the post into its mating hole, then, snap outwardly as the barbs protrude below the mounting surface (FIG. 3) to lock clip 10 thereagainst. A pair of flexible opposed fingers 50 extended downwardly and outwardly from the base of column 46 at its point of connection to base 16. These fingers generate a downward axial force on the working surface which, in turn, biases barbs 48 upwardly in tight engagement against this surface. A recess 52 is provided in the bottom of base 16 and functions to receive fingers 50 as they are flexed upwardly.

Cables are firmly held against the clip base 16 by a pair of arcuate cantilever elements 54 and 56 which extend generally downwardly from the clip top wall 24. The structure of these elements is best seen in the "empty" clip (i.e. no cables therein) depicted in FIG. 1. Primary element 54 interconnects to the top wall substantially at its intersection with side wall 26 and defines a gradually decreasing slope as it approaches, and preferably contacts, the base (when no cables are present). The end of element 54 is provided with an upwardly contoured tip or shovel region 58 which functions in a manner analogous to that of a ski to facilitate the unrestricted slipping movement of element 54 over cables therebelow as the clip is latched.

Secondary element 56 interconnects with the top wall substantially at its intersection with side wall 20 and, in similar fashion, defines a gradually decreasing slope downwardly and to the left. Element 56 is somewhat shorter than element 54 and extends only approximately half the distance to base 16 before leveling out and terminating adjacent primary member 54. The tip 60 may be contoured as described above to assure proper sliding movement of the secondary member on the primary member.

Referring to FIG. 3, clip 10 is shown with a single, narrow ribbon cable 14 therein. The phantom (dotted) outline depicted in FIG. 3 illustrates the position of the strap 18, during closure of the clip, at the instant the primary element tip 58 first contacts cable 14. As the strap is urged downwardly into locking engagement with latch 30, primary element 54 is deflected upwardly (i.e. counterclockwise rotation about its point of attachment to top wall 24) as the tip 58 slides across cable 14. Again, the ski-shaped contour of tip 58 assures proper lateral movement of the tip relative to the cable without the tip snagging or binding on one of the several individual wire strands which often characterizes a ribbon or flat wire cable. For small cables, the deflection of primary element 54 is not sufficient to cause substantial engagement of the secondary element and, consequently, the cable is held firmly against base member 16 principally by the force of the deflected primary element.

Figure 4:
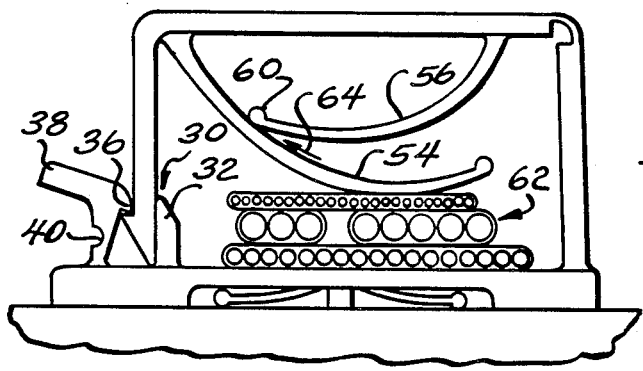
FIG. 4 is a front elevation view of the flat wire clip of the present invention illustrating closure on an intermediate thickness bundle of ribbon cables; and, FIG. 5 is a front elevation view of the flat wire clip of the present invention illustrating closure on a large thickness bundle of ribbon cables.

Referring now to FIG. 4, a clip according to the present invention is shown engaging a bundle of flat wires 62 of intermediate thickness or height. Cable engagement commences substantially as described above, however, with the primary element being forced further upwardly and to the right. The secondary element 56 now comes into play as upward travel of the primary element operatively engages the tip 60 of element 56. Specifically, the tip 60 of the secondary element slides along the primary element and is urged generally upwardly, as illustrated by arrow 64, in direct response to the corresponding upward movement of the primary element.

The secondary element tip 60 may be contoured as described above to assure proper sliding engagement between the respective elements although such contouring is generally not essential as the surface of the primary element is of known uniformity (this, in contrast to the often irregular ribbon cable surface over which the primary element tip 58 must travel). Cable bundle 62 is held firmly against base 16 by the downward force exerted by, and through, primary element 54. This force is comprised of two elements, first, the force generated by the deformation of the primary element itself and, second, the deformation force of the secondary element which, in turn, is transmitted to cables 62 through the primary element.

Figure 5:
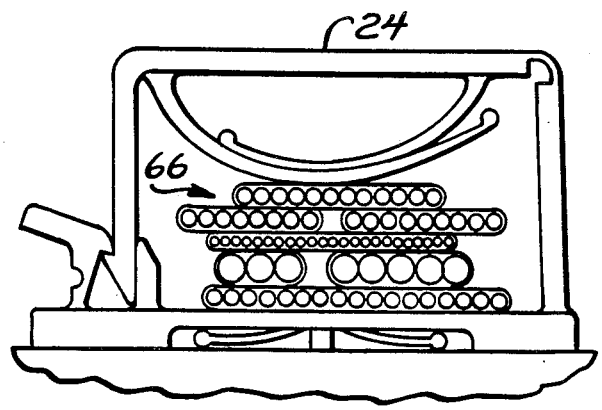

FIG. 5 illustrates use of the present clip to retain a large bundle of flat wire cables 66 generally of an overall thickness exceeding the capabilities of conventional banjo spring flat wire clips. In this connection, a comparison of FIGS. 3 and 5 quickly reveals the wide range of cable thicknesses that a single clip according to the present invention can accomodate. As the clip is loaded approaching its maximum capability; that is, as the height of the cables 66 substantially fills the rectangular opening 12, respective movement of the primary and secondary elements continues with the elements progressively nesting parallel and adjacent to the top wall 24. The elements thereby occupy a minimum vertical space approaching as little as the combined thicknesses of the two elements. A downward cable retention force is maintained on cables 66, as before, through primary element 54 by reason of the combined deflection forces of both the primary and secondary elements. Advantageously, the top wall 24 does not substantially deform when the clip is increasingly filled with cables by reason that the cantilever elements 54, 56 attach to the top wall at points, respectively, immediately adjacent the side walls which, in turn, significantly restrict upward travel of the clip to wall.

We claim:
1. A clip for retaining flat wire or ribbon cables on a surface including a base; means for mounting the base to the surface; a strap integrally affixed to the base at a first end of the strap; latch means for attaching a second end of the strap to the base thereby closing the clip and creating a cable retention passage within the region bounded by the strap and base, the strap having a center section oriented in opposed relationship to the base when the clip is closed; means integrally affixed to the strap center section and extending toward the base for biasing wires or cables in the passage against the base, said biasing means including first flexible cantilever means integral to, and extending from, the strap center section substantially along the passage toward the base; second flexible cantilever means integral to, and extending from, the strap center section toward the base to a point proximate the first flexible cantilever means, the distal end of the second cantilever means adapted for sliding engagement along the first cantilever means upon latching of cables in the clip; the cable retention passage being defined as the region between the base and the biasing means whereby the cantilever means act and coact to urge flat wire or ribbon cables into abutting contact against the base when the clip is closed.

2. A clip for retaining flat wire or ribbon cables on a surface including a base; means for mounting the base to the surface; a strap integrally affixed to the base at a first end of the strap; latch means for attaching a second end of the strap to the base thereby closing the clip and creating a cable retention passage defined by the region bounded by the strap and base, the strap having a center section oriented in opposed relationship across the passage when the clip is closed, the center section having first and second ends generally defining respective first and second ends of the cable retention passage; first flexible cantilever means integral to and extending substantially from the first end of the strap center section substantially across the passage toward the base and the second end of the passage; second flexible cantilever means integral to and extending substantially from the second end of the strap center section into the passage toward the base and first passage end to a point proximate the first flexible cantilever, the distal end of the second cantilever means adapted for sliding engagement along the first cantilever means upon latching of cables in the clip; means whereby the cantilever means act and coact to urge flat wire or ribbon cables into abutting contact against the base when the clip is closed.

3. The clip for retaining flat wire or ribbon cables of claim 1 wherein the first and second cantilever means each define a concave curvilinear form opening generally away from the base.

4. A clip for retaining flat wire or ribbon cables on a surface including a generally planar base; means for mounting the base to the surface; a strap integrally affixed to the base at a first end of the strap; latch means for attaching a second end of the strap to the base thereby closing the clip and creating a cable retention passage defined by the region bounded by the strap and base, the strap having substantially planar first, top, and second walls, the top wall being disposed across the cable retention passage and in substantially parallel relationship to the base when the clip is closed, the top wall having first and second ends generally defining respective first and second ends of the cable retention passage; first flexible cantilever means integral to and extending substantially from the first end of the strap top wall substantially across the passage toward the base and the second end of the passage; second flexible cantilever means integral to and extending substantially from the second end of the strap top wall into the passage toward the base and first passage end to a point proximate the first flexible cantilever means, the distal end of the second cantilever means adapted for sliding engagement along the first cantilever means upon latching of cables in the clip; whereby the cantilever means act and coact to urge flat wire or ribbon cables into abutting contact against the base when the clip is closed.

* * * * *